US006259352B1

(12) United States Patent
Yulkowski et al.

(10) Patent No.: US 6,259,352 B1
(45) Date of Patent: Jul. 10, 2001

(54) DOOR LOCK SYSTEM

(76) Inventors: Leon Yulkowski, 4390 Derry, Bloomfield Hills, MI (US) 48302; Edward J. Yenni, 32139 Hampton Ct., Avon Lake, OH (US) 44012-2510

( * ) Notice: Subject to any disclaimer, the term of this patent is extended or adjusted under 35 U.S.C. 154(b) by 0 days.

(21) Appl. No.: 09/032,966

(22) Filed: Mar. 2, 1998

(51) Int. Cl.[7] ........................................ H04Q 1/00
(52) U.S. Cl. ........................................ 340/5.7; 70/277
(58) Field of Search ........................ 340/825.31; 235/382; 70/278.1, 277

(56) References Cited

U.S. PATENT DOCUMENTS

| | | |
|---|---|---|
| 3,811,717 | 5/1974 | Floyd et al. . |
| 3,828,340 | 8/1974 | Bauer, Jr. et al. . |
| 4,015,869 | 4/1977 | Horvath . |
| 4,148,092 | 4/1979 | Martin . |
| 4,258,358 | 3/1981 | Lee et al. . |
| 4,287,512 | 9/1981 | Combs . |
| 4,335,376 | 6/1982 | Marquardt . |
| 4,427,975 | 1/1984 | Kinzie . |
| 4,516,114 | 5/1985 | Cook . |
| 4,848,115 | 7/1989 | Clarkson et al. . |
| 5,072,973 | 12/1991 | Gudgel et al. . |
| 5,083,122 | 1/1992 | Clark . |
| 5,353,015 | 10/1994 | Robinson . |
| 5,392,025 | 2/1995 | Figh et al. . |
| 5,424,716 | 6/1995 | Park . |
| 5,455,562 | 10/1995 | Chin . |
| 5,461,363 | 10/1995 | Chang . |
| 5,473,236 | 12/1995 | Frolov . |
| 5,473,310 | 12/1995 | Ko . |
| 5,477,041 | 12/1995 | Miron et al. . |
| 5,530,428 | 6/1996 | Woods . |
| 5,539,378 | 7/1996 | Chang . |
| 5,572,190 | 11/1996 | Ross et al. . |
| 5,576,581 | 11/1996 | Iannuzzi et al. . |
| 5,979,754 * | 11/1999 | Martin et al. ........................ 235/382 |

OTHER PUBLICATIONS

"Interoperable Control Networks Using Lonworks® Technology" Lonworks Workshop; 1995 Echelon Corporation.

* cited by examiner

*Primary Examiner*—Brian Zimmerman
(74) *Attorney, Agent, or Firm*—Kevin G. Mierzwa

(57) ABSTRACT

A door system has a plurality of doors coupled to communication lines which interconnect the doors. The doors have a first outer face having an opening therein and a second outer face spaced a predetermined distance apart from the first outer face. A void is located between the first and second outer face and is sized to receive at least a portion of an integrated door unit. A wiring harness is located between the first and second outer faces. The wiring harness has a connector coupled thereto. The wiring harness is coupled to the integrated door unit. A sensor is coupled to the integrated door unit. To communicate, the integrated door units have a memory storing an address, and a data map. The integrated door units form output data words using the address and the data map.

43 Claims, 5 Drawing Sheets

DOOR LOCK SYSTEM

RELATED APPLICATIONS

The present invention is related to copending application entitled "Door with Integrated Smoke Detector and Hold Open", Ser. No. 09/033,383, now U.S. Pat. No. 6,049,287, which is filed simultaneously herewith and hereby incorporated by reference herein.

BACKGROUND OF THE INVENTION

The present invention relates generally to an entry door for a building and, more specifically, to a building door having electrical components associated therewith for sensing and reacting to emergency conditions and having the capability to communicate with other doors as part of a door network.

Installing doors into buildings under construction typically requires the assistance of various tradesmen. For example, for one opening, tradesmen such as carpenters, painters, glaziers, electricians and drywallers are required to complete the installation of a door. Other tradesmen may also be used for the installation of a door. The number of tradesmen increases when the door has security or other speciality items incorporated near the door opening.

Once a door is installed, the interaction of the various components must be verified. In many instances, one of the many skilled trades must return to the opening to adjust or replace various components that are not functioning properly.

One of the various types of components associated with a door opening is a hold open. Hold opens are mounted to a wall or door closer to hold a door in the open position. The door may be held open by a cam and motor device or electromechanical means. Smoke detectors and/or fire detectors are also commonly coupled near an opening of a building. U.S. Pat. No. 5,072,973 teaches a device having a smoke detector and hold open using a motor and cam. Upon detection of smoke, the smoke detector releases the hold open to allow the door to close.

One problem with such a device is that the functionality of the components within the door must be checked after the installation of the door. In some circumstances, either the door or hold open must be adjusted requiring the expensive use of one or several skilled trades.

SUMMARY OF THE INVENTION

It is therefore one object of the invention to provide a less costly door system. To reduce the numbers of components installed on site certain components are preinstalled and tested in a factory environment. Such components, for example, may include a hold open and a smoke detection device within the door.

In one aspect of the invention, a door has a first outer face having an opening therein and a second outer face spaced a predetermined distance apart from the first outer face. A void is located between the first and second outer face and is sized to receive at least a portion of an integrated door unit. A wiring harness is located between said first and second outer faces. The wiring harness has a connector coupled thereto. The wiring harness is coupled to the integrated door unit. A sensor is coupled to the integrated door unit.

In a further aspect of the invention, a single or plurality of communication lines couple together a plurality of integrated door units each associated with a respective door. Each of the integrated door units having a memory storing an address, and a data map. The integrated door units form output data words using the address and the data map.

In another aspect of the invention, a plurality of communication lines couple a plurality of integrated door units together. The integrated door unit forms data output words. Each of the integrated door units have an address associated therewith. Each of the integrated door units have a transceiver and a door controller coupled to the transceiver. The transceiver receives data output words and directs data output words having a corresponding address to its associated door controller. The controller generates a response to the data output word.

One advantage of the invention is that a central controller is not required. Each integrated door unit is coupled to a network through which each integrated door unit can communicate to each other in a predetermined format.

BRIEF DESCRIPTION OF THE DRAWINGS

Other features and advantages of the present invention will become apparent from the detailed description which should be read in conjunction with the drawings in which.

DETAILED DESCRIPTION OF THE PREFERRED EMBODIMENT

Figure 1:
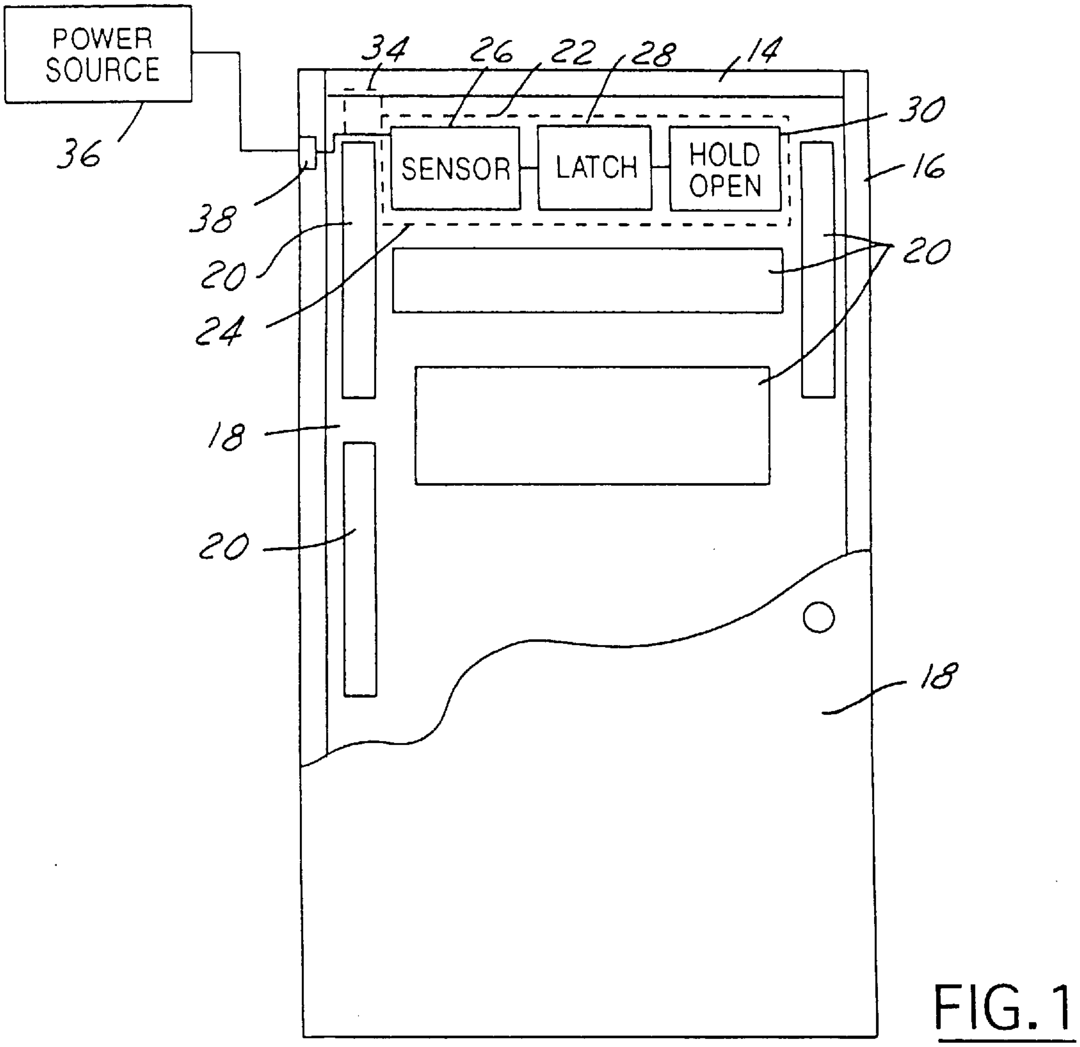
FIG. 1 is a partially cutaway elevational view of a door according to the present invention.

Referring now to the drawings, like reference numerals are used to identify identical components in the various views. While the door is illustrated with respect to a flush door having door skins, the teachings of the invention may apply equally to any type of door including a monolithic door.

Referring now to FIG. 1, a door 10 is shown having a frame 12 around its perimeter. Frame 12 comprises horizontal stiles 14 and vertical stiles 16. Horizontal stiles 14 and vertical stiles 16 may be formed from a variety of materials including wood, metal or a composite material.

Door 10 has a pair of outer faces 18. A portion of one of outer faces 18 is only partially shown to reveal the core of door 10. A number of spacers 20 are typically incorporated to hold outer faces 18 a predetermined distance apart. Spacers 20 are commonly used in the industry. Spacers are formed of cardboard, wood blocks, expanded polystyrene, metal or honeycomb. A void 22 is formed between spacers 20 and outer faces 18. Void 22 is sized to house electric components 24.

Electric components 24 may comprise a sensor 26, a latch 28, and a hold open 30. Sensor 26 is coupled to hold open 30 through latch 28. As shown, components are represented individually. However, sensor 26, latch 28 and hold open 30 may be coupled to a single housing prior to assembling the door to expedite assembly of the door.

Sensor 26 is used to sense an undesirable condition such as fire or high levels of a gas such as carbon monoxide. Sensor 26 is preferably a smoke detector or heat detector. Many integrated circuit manufacturers have a smoke detector integrated circuit chip. For example, Motorola model number 14467-1 is a suitable smoke detector integrated circuit chip.

Latch 28 is an electrically actuated latch which couples sensor 26 to hold open 30. Latch 28 may, for example, be a relay, a transistor, multi-vibrator or other electrically actuated latch. Latch 28 is coupled to sensor 26. The output of sensor 26 changes the state of latch 28 to activate or deactivate hold open 30.

Hold open 30 is preferably an electromagnetic hold open. Hold open 30 is electrically coupled to latch 28. Hold open 30, when energized, allows door 10 to be held in an open position. Upon deactivation of hold open 30, door 10 is able to close.

A door closer 34 is coupled to door 10. Door closer 34 may, for example, be a conventional spring loaded or pneumatic door closer commonly used in buildings. When hold open 30 is deactivated, door closer 34 provides the force to pull door 10 to the closed position. When activated, hold open 30 overcomes the closing force provided by door closer 34.

Sensor 26, latch 28 and hold open 30 are all coupled to a power source 36 through a connector 38 and a wiring harness 40. Connector 38 is coupled to an opening in door 10. Power source 36 may be an AC or DC source of power. Wiring harness 40 may be a two wire pair coupled to corresponding pins of a connector 38. A mating connector (not shown) is coupled to pin connector 38 to power source 36.

Figure 2:
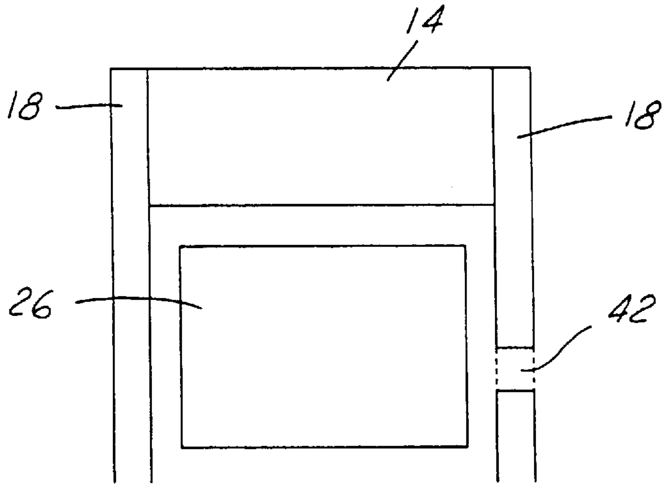
FIG. 2 is a side cross-sectional view of the sensor in the door of FIG. 1.

Referring now to FIG. 2, sensor 26 is coupled between outer faces 18. Sensor 26 is located proximate an opening 42 in one or both of outer faces 18. If sensor 26 is a smoke sensor or heat sensor, some means for admitting smoke to the internal core of the door 10 should be provided to provide adequate detection.

Figure 3:
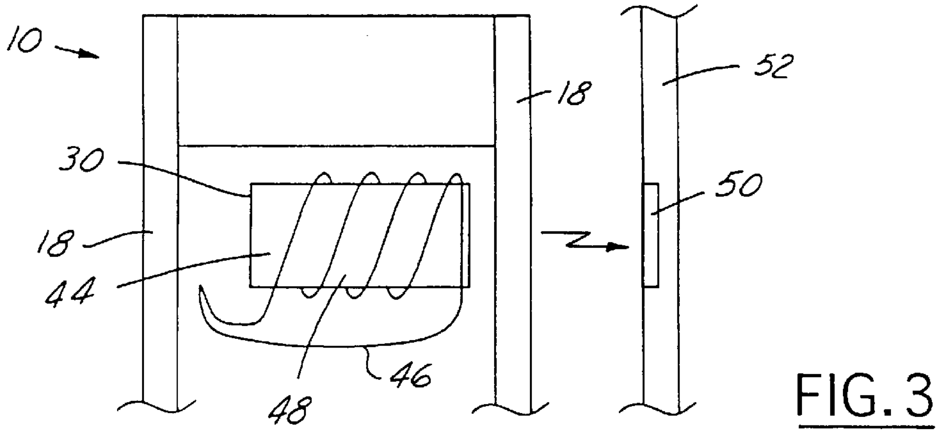
FIG. 3 is a side cross-sectional view of a hold open in the door of FIG. 1.

Referring now to FIG. 3, hold open 30 is represented as an electromagnet 44. Electromagnet 44 has a wire 46 coiled around a metal core 48. Of course, other configurations of an electromagnet would be evident to those skilled in the art. Enough current must be drawn through wire 46 to develop a sufficient magnetic field to hold door open against the force of door closer 34. When door 10 is in the open position, electromagnet 44 is positioned adjacent to a plate 50 in a wall 52. Plate 50 is preferably made of a magnetic material to attract the activated electromagnet 44.

Figure 10:
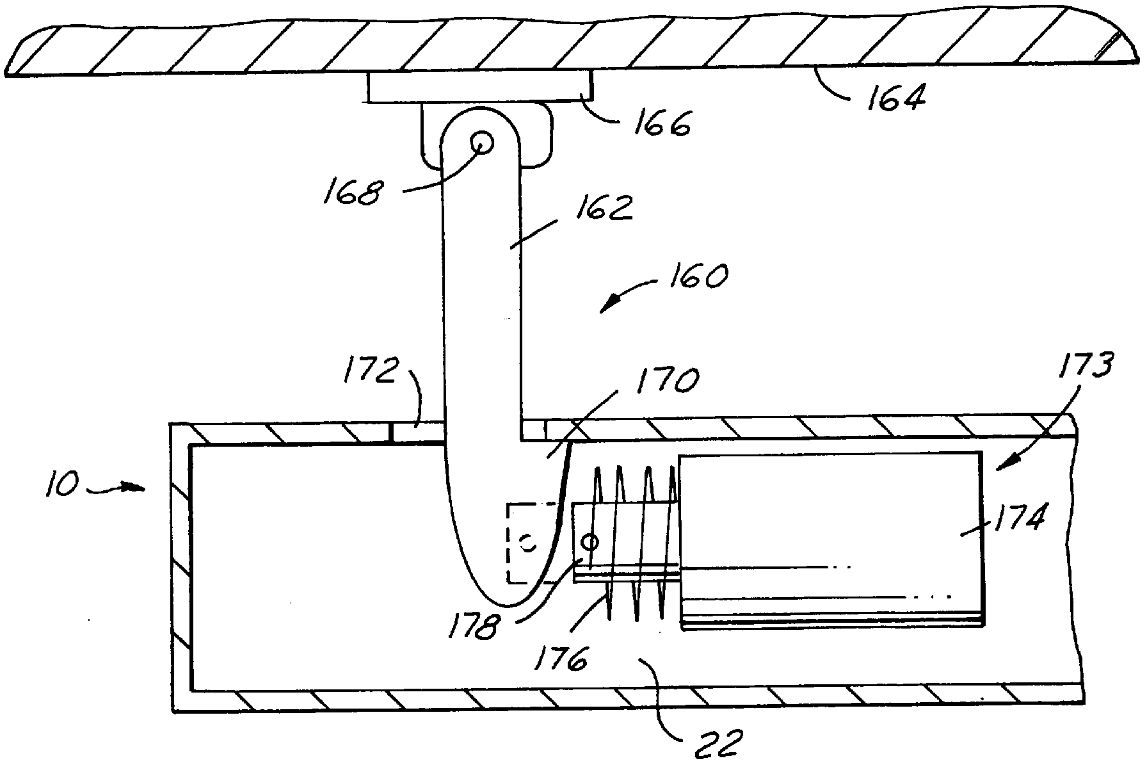
FIG. 10 is an alternative embodiment of a hold open of the present invention.

Referring now to FIG. 10, an alternative hold open 160 is shown to that shown in FIG. 3. Hold open 160 is comprised of a holder 162 an end of which is pivotally mounted to a base 166 that is securely fastened to a wall 164. A pin 168 issued to pivotally couple holder 162 and base 166.

A catch 170 is located at the other end of holder 162. Catch 170 is shaped to engage with a surface of door 10 within an opening 172 in door 10.

An electrically actuated spring release 173 is used to hold door open. Electrically actuated spring release 173 has a solenoid 174, a plunger 176 and a spring 178. Solenoid 174 is preferably located within void 22. Solenoid 174 is used to control the movement of plunger 176. Solenoid 174 is coupled to the smoke detector and operates in conjunction with the smoke detector. That is, when smoke is detected the hold open releases door 10.

Spring 178 is coupled between solenoid 174 and plunger 176. Spring 178 biases plunger toward the solenoid. When solenoid 174 is energized, the spring force of spring 178 is overcome by plunger 176 and displaces catch 170 from face 18. The disengagement in conjunction with a conventional door closer allows door 10 to close.

Figure 4:
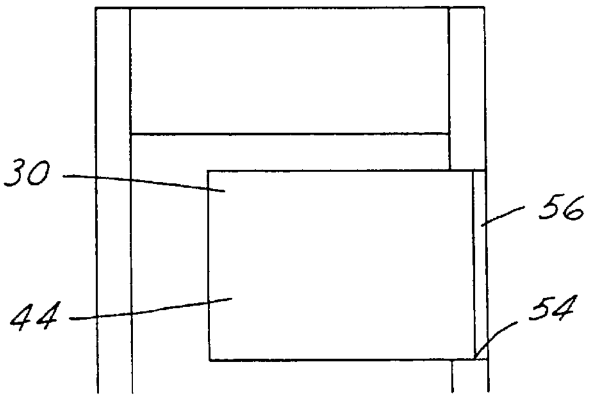
FIG. 4 is an alternative side cross-sectional view of a door.

Referring now to FIG. 4, an alternative embodiment to that shown in FIG. 3 is illustrated. Hold open 30 may be placed within an opening 54 in an outer face 18 of door 10. In this manner, hold open 30 will be closer to wall 52. Such a configuration is particularly desirable if outer faces 18 are formed from a magnetic material. In such a case, a cover panel 56 made of a non-metallic material may be used to cover opening 54 to provide an aesthetically pleasing door surface. Cover panel 56 may then be finished to match the entire door. Painting cover panel 56 will not interrupt the magnetic field from electromagnetic 44. Cover 56 may also be removable to provide access to service hold open 30 or sensor 26.

The assembly of the door and components within the door are all preferably formed in a controlled factory environment. One of the pair of door faces 18 is placed in a horizontal position. Horizontal stiles 14 and vertical stiles 16 are used to form frame 12 around the perimeter of the first face 18. Spacers 20 are placed within the door to ultimately hold the pair of outer faces 18 apart. It is preferred that spacers 20, horizontal stiles 14 and vertical stiles 16 are glued or otherwise secured to the horizontally placed outer face 18. Spacers 20 are placed to leave a void 22 sized to receive electric components 24. Electric components 24 are then placed within the door 10. Electric components 24, for example, may be a sensor 26, a latch 28 and a hold open 30. Electric components 24 may also be inserted together if mounted to a single housing. Prior to assembling the second outer face to enclose the door 10, the operation of sensor 26 and hold open 30 may be tested. Alternatively, the second outer face may be placed onto the horizonal stiles 14 and vertical stiles 16 and thereafter the electric components 24 may be tested. During assembly, the connector 38 is inserted in an opening preferably within the edge of door. Wiring harness 40 connects the connector to electric components 24.

In this pretested manner, the assembled door 10 provides the significant advantage of doubling as a shipping container to protect the electric components contained therein.

Figure 5:
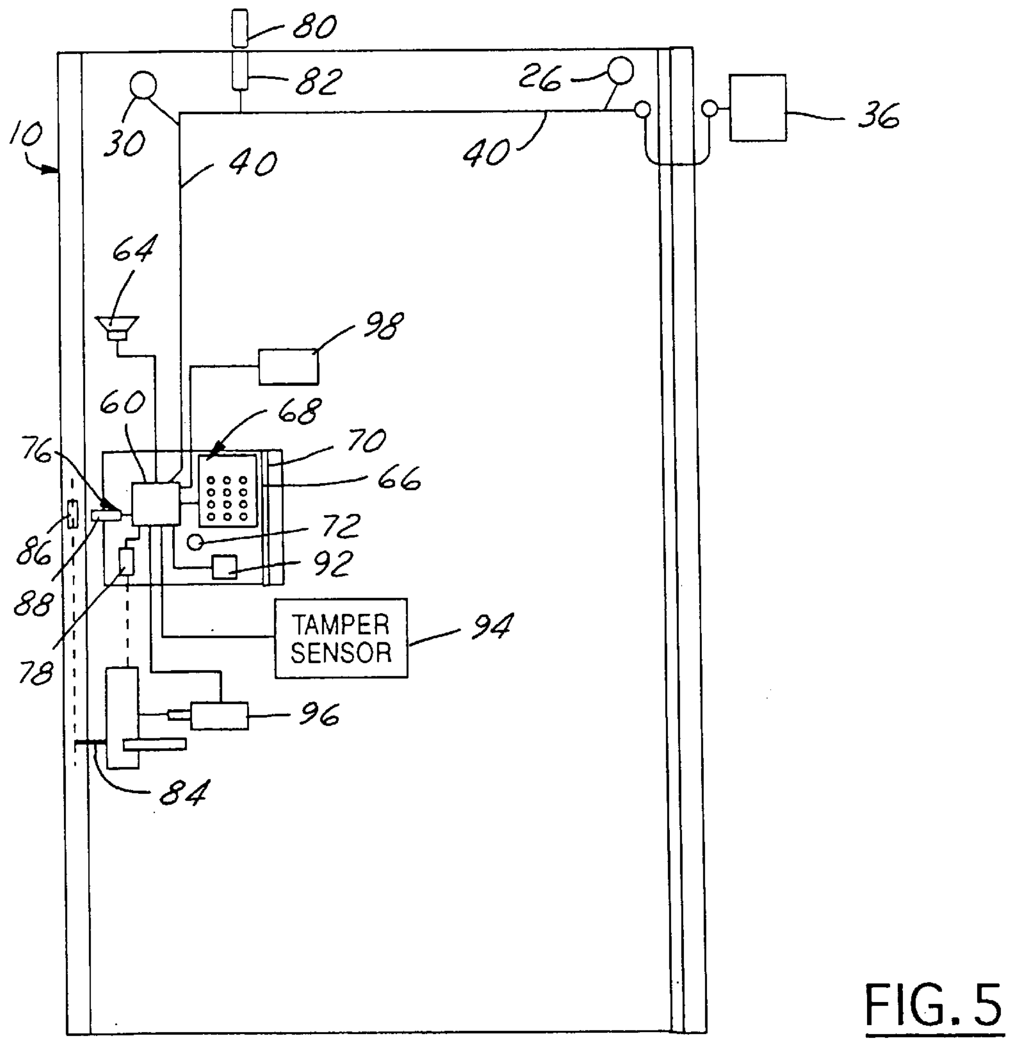
FIG. 5 is a schematic view of a door system according to the present invention.

Referring now to FIG. 5, hold open 30 and sensor 26 may be part of a more elaborate door configuration. The heart of the configuration is a door controller 60. Door controller 60 is preferably a microprocessor-based controller. Door controller 60 may be used to control various outputs within the door based on various sensor inputs. Door controller 60 may also provide information to a central controller through wiring harness 40. Controller 60 may be coupled to one or many input sensors and outputs. Controller 60, in a simple configuration, may act as a latch to activate an alarm 64 and to deactivate hold open 30 upon the sensing of smoke or fire by sensor 26. Of course, the various types and numbers of sensors supplied within a door may vary depending on the location of the door within the building.

One input to controller 60 may be an access control device 66. As illustrated, access control device 66 is a key pad 68 and a card reader 70. Key pad 68 allows the input of an identification code to controller 66 to allow the door to unlock or lock. Card reader 70 may be used to insert or slide a card therethrough to unlock or lock the door. Keypad 68 and card reader 70 may intersect so that both a card and an identification code are required to gain access within an opening. Of course, those skilled in the art would recognize that several types of access control devices maybe employed to provide various degrees of security. For example, access control device may also be a biometric reader such as a retina scan, a finger print scan, face temperature pattern or voice recognition.

Another input to control 60 may be a video camera 72. Video camera 72 may be used for monitoring the opening. Various small size monitoring video cameras are well known in the art. Video camera 72 may be used for biometric screening.

Other inputs may include position sensors (74, 76, and 78) which detect the position of the door and locking mechanism. Position sensors may include a door-in-frame sensor 74, a door latch sensor 76 and a door locked sensor 78.

Door-in-frame sensor 74 may, for example, comprise a magnet 80 mounted on the frame of the door and a relay 82 within door 10. When relay 82 is adjacent to magnet 80, relay 82 changes state from that when relay 82 is not adjacent to magnet 80. For example, relay 82 may be open when not in the presence of magnet 80 and closed when in the presence of magnet 80. The changing of state may be monitored by controller 60 through wiring harness 40. Relay 82 is preferably mounted within door 10. That is, relay 82 is preferably mounted between the pair of outer faces 18. By mounting relay 82 between outer faces 18, the aesthetic appearance of door 10 is improved since the relay is not visible.

Door latch sensor 76 may be coupled to a door latch 84. Door latch sensor 76 may comprise a magnet 86 and a relay 88. Door latch sensor 76 operates in a similar matter to that of door-in-frame sensor 74. That is, the relay 88 changes state when magnet 86 is adjacent to relay 88. Magnet 86 is preferably mechanically linked to door latch 84, for example, by a rod or other means so that upon movement of latch 84, magnet 86 moves correspondingly.

Door lock sensor 78 changes state when door lock 90 is in a locked and unlocked position. Door lock sensor 78 may be a magnet/relay sensor similar to that described above. Door lock sensor 78 may be a switch mounted to lock 90 so that a different state is output when the door is in the locked or unlocked position.

Another possible input to controller 60 is a panic relay 92. Panic relay 92 may be associated with a panic button located on an accessible position of door 10. Thus, when danger is near, a person may push the panic button which triggers, for example, alarm 64 to be activated and/or a signal to be sent to a central controller so that help may be dispatched.

Another input to controller 60 may be a tamper sensor 94. Tamper sensor 94 may, for example, be a strain gauge coupled to the housing in which door controller 60 is contained. Tamper sensor 94 detects an attempt to gain access with controller 60 which may be an indication that a person is attempting to gain unauthorized access to a controlled area.

Yet another input to controller is a clock/calendar 98. Clock/calendar 98 provides controller 60 with date and time information. Suitable clocks are commonly found in personal computers.

Outputs controlled by controller 60 may include hold open 30 as described above, and alarm 64.

Another potential output of controller 60 is an electrical door locker 96. Door locker 96 may, for example, be solenoid actuated. Electronic door locker 96 may be moved to the unlock position upon the verification of entry. As described above verification may be a proper access code input in at keypad 68 or a proper card inserted within card reader 70 or a verification using biometric screening. Electronic door locker 96 may also be used to either lock or unlock in the event a fire is detected by sensor 26.

Another output may be an LED or tone indicator (not shown) to provide a signal function that access has been gained or denied.

Figure 6:
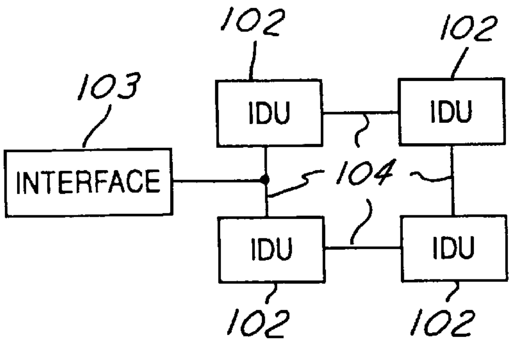
FIG. 6 is a block diagram of a network of door system according to the present invention.

The above described door is preferably part of a larger building control system. Referring now to FIG. 6, each building opening preferably has an integrated door unit 102. Each integrated door unit 102, for example, contains a controller 60 as described above. Each integrated door unit 102 may be coupled to other integrated door units 102 of the system. The controller and communications, for example, may be configured according to the LonWorks® package from the Echelon Corporation. As will be further described below, a central controller need not be present.

Each integrated door unit 102 is coupled together through communication lines 104. Communication lines 104 are used provide other integrated door unit 102 with information regarding system parameters such as the status of each integrated door unit. Communication lines 104 may be bundled together with power and ground for each opening. A power line carrier may also be used for communication to eliminate the need for distinct data lines. Power line carriers are well known in the art. Communication lines 104 may be coupled to wiring harness 40 through connector 38.

Communication lines 104 may also be coupled to an internet connection or phone line connection through an interface 103 so that the status of the integrated door units may be polled from a remote location if desired. If a camera is used the internet may provide a remote means for viewing the camera. Phone lines through interface 103 may also be used to communicate with police or fire dispatch upon the detection of an emergency condition by an integrated door unit.

Figure 7:
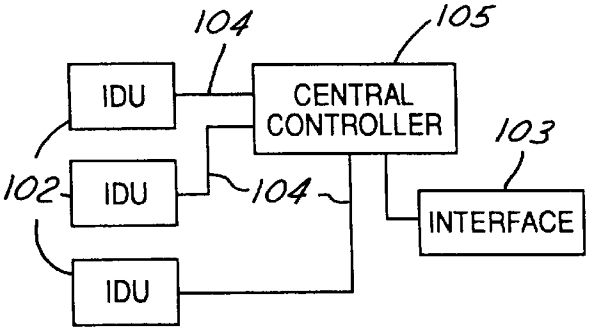
FIG. 7 is a block diagram of a network of an alternative door system according to the present invention.

Referring now to FIG. 7, a block diagram of an alternative embodiment of a building control system is illustrated. A central controller 105 is illustrated as being coupled directly to each integrated door unit 102 to control communications therebetween. Central controller 105 also may be coupled to integrated door units 102 through a ring, star, daisy-chain, loop configuration or by radio frequency. Central controller 105 may initiate a response in integrated door unit from the output of another integrated door unit. Controller 105 may be a central monitoring station. Central controller 105 may also be coupled to an interface 103.

Figure 8:
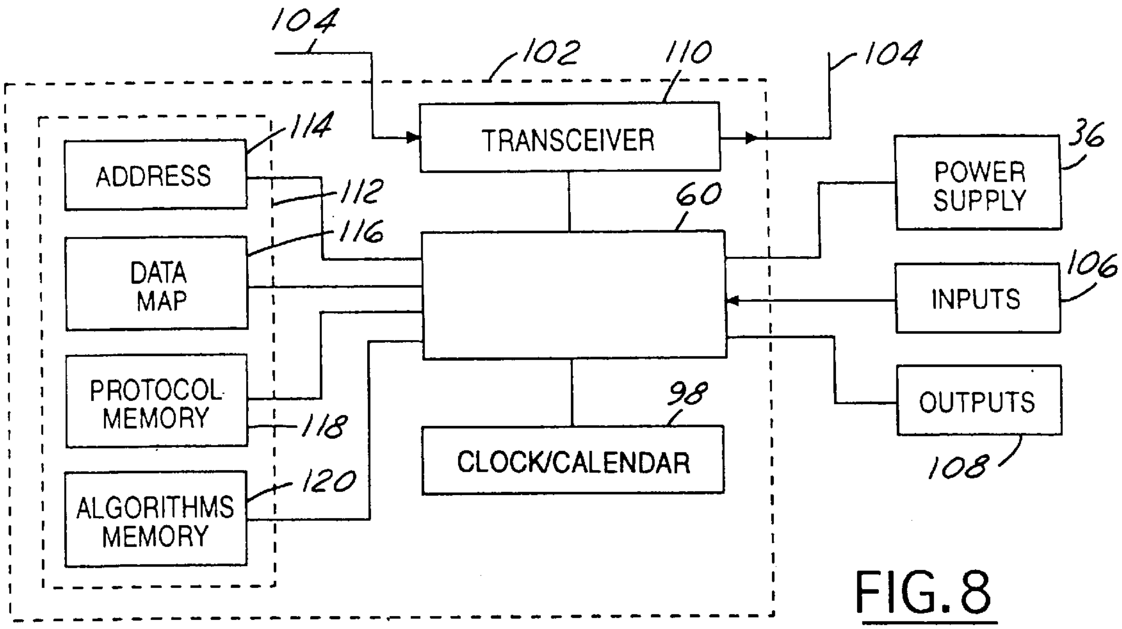
FIG. 8 is a block diagram of an integrated door unit.

Referring now to FIG. 8, a block diagram of integrated door unit 102 is shown coupled to inputs 106, outputs 108 and a power supply 36. Inputs 106 and outputs 108 are generally described above in connection with FIG. 5. As described above, the content function of the door may vary depending on the desired functions. Preferably, inputs 106 and outputs 108 are located within outer faces 18 of door 10. Power supply 36 is located remote from door 10.

Integrated door unit 102 has a door controller 60 coupled to clock/calendar 98, a transceiver 110 and a memory 112. As described above, door controller 60 is preferably a microprocessor-based controller. Controller 60 performs various functions based on inputs 106 and outputs 108 from door 10. Controller 60 also performs various functions based on information received through transceiver 110. Controller 60 is also used to form data output words. The data output words allow controllers 60 from the network to communicate with each other.

The output word may contain various portions such as the address of the door unit, the address of the destination unit and data to be input to other network integrated door units. The destination address may be coded for more than one location in a broadcast mode.

In a preferred embodiment, the output data word and the data portion have a time stamp derived from the clock. The time stamp may also contain data information. In this manner, various integrated door units may utilize this in an algorithm or intercoding of particular events.

Transceiver 110 is an interface between the communication lines and the integrated door unit 102. Transceiver 110 is used to transmit to and receive data from other integrated door units 102 of the building control system. Transceiver 110 may in itself be a microprocessor based system. The LonWorks® package has a transceiver and uses three microprocessors to control the transmission and reception of data. Transceiver 110 recognizes data on communication lines 104 intended for its associated controller 60. Only data associated with door controller 60 is delivered to door controller 60. As is described further below, data words on communication lines 104 have a destination address or identifier. When data words have the destination address associated with the particular integrated door unit, the transceiver passes the data word to door controller 60 of that integrated door unit.

Memory 112 may be used to store various information associated with door controller 60. Memory 112 is illustrated as having an address memory 114, a data map memory 116, a protocol memory 118 and an algorithm memory 120. The operating program may also be its own memory component. Although illustrated as separate components, memory, for example, may be contained on a single chip such as an EPROM. Memory 112 may also be formed of various types of memory such as RAM and ROM.

In a network, each integrated door unit 102 has a unique address used for identification stored in address memory 114. Several types of addresses may be used. For example, a guaranteed unique physical address may be used or a logical address may be used. A physical address may, for example, be the door assembly number for that door. A logical address may be a name location for the door.

Data map 116 preferably comprises a table containing data representing addresses of various other door units to which communication will be directed on the network. Data map 116 provides information to be put in an output word so that the transceiver of the proper devices on the network will recognize the data and direct the data to the integrated door unit. Data map 116 is particularly important in a system when a central controller 105 is not used.

Protocol memory 118 is used to store network communication default values. Protocol memory 118, for example, may store communication rates, priorities, and transmission media among other information.

Algorithms memory 120 stores a plurality of functions to be implemented based on information received from the network and information from inputs 106 and outputs 108. Various algorithms may be stored in algorithms memory 120. The complexity of the algorithms depends on the complexity of the network. One simple example of an algorithm may, for example, be for a hold open on various doors to release their doors to the closed position when smoke or fire is sensed at a particular door. This may isolate a portion of a building to prevent the spread of fire.

As would be evident to those skilled in the art, a door system according to the present invention has a particular advantage of being capable of being tested prior to leaving its manufacturing environment. The door acts as a shipping unit that protects the components stored therein. The present invention is particularly suitable for installation into buildings under construction. The building can then be easily wired for the door system network communication. Of course, a door system may also be wired into an existing building.

Figure 9:
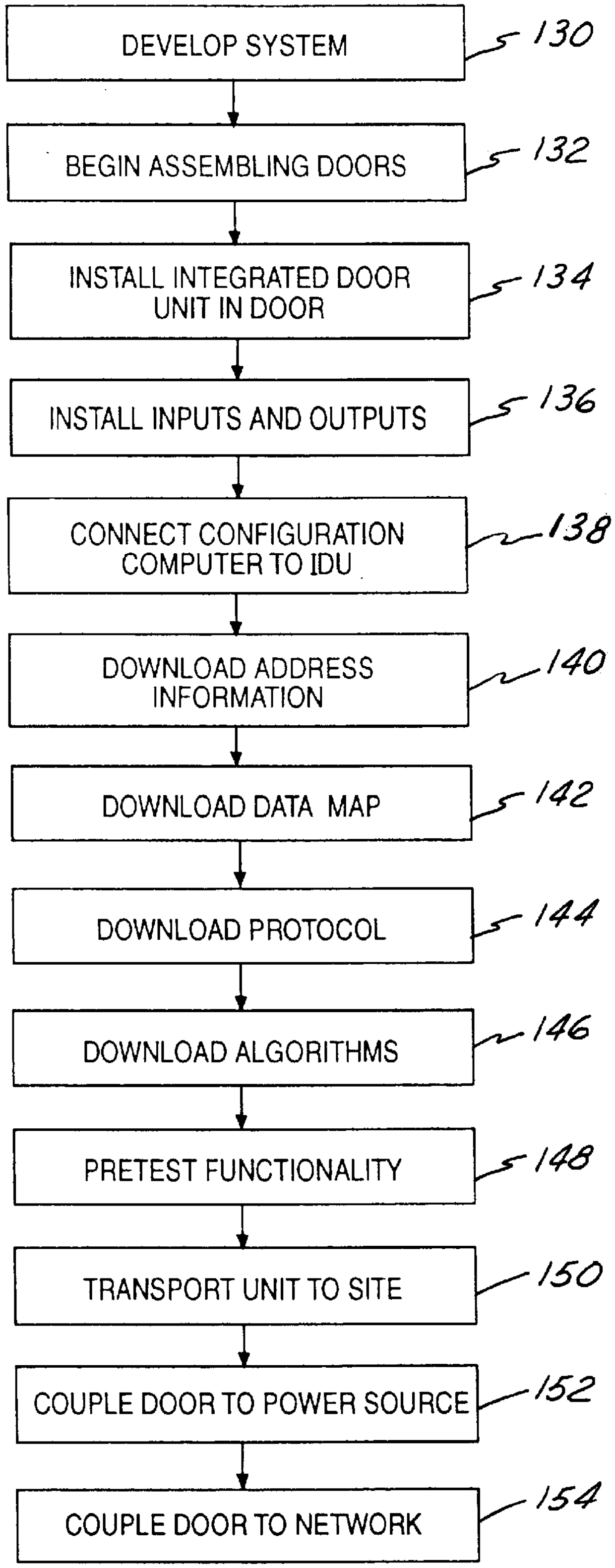
FIG. 9 is a flow chart of a manufacturing method of a door according to the present invention.

Referring now to the flow chart of FIG. 9, a network system is developed prior to assembling doors. In this manner, the position of each door may be noted as well as the particular algorithms that are to be associated with door may be developed. This system development is represented by step 130.

In step 132, the assembly of the doors is started. As stated above, for example, a door face may be laid in horizontal position to facilitate assembly. The frame of the door may be assembled around the perimeter of the door. Holes for receiving various sensors and the network communication lines may be predrilled.

In step 134, integrated door unit is installed within the door. As stated above, integrated door unit may, for example, have a memory 112, a transceiver 110 and a door controller 60 associated therewith. In fact, it is preferred that integrated door unit be housed within a single housing to ease assembly.

In step 136, the inputs and outputs of the door are coupled to the integrated door unit 102. As recited above, each door may have a slightly different configuration. Various inputs and outputs may be required based on the desired functionality of each door. In step 138, the inputs and outputs are connected to integrated door unit 102. The system is then coupled to a configuration computer located near the assembly line. Information is then downloaded into memory 112. In step 140, protocol information is stored in protocol memory 118. In step 142, algorithms are stored in algorithm memory 120. In step 144, the data map is stored in data map memory 116. In step 146, address information is stored in address memory 114.

In step 142, various function algorithms that are desired to be performed by integrated door unit may be loaded into algorithm memory 120.

After the door is configured with the various electronic components including the integrated door unit 102, inputs 106 and outputs 108, the system may be checked for functionality in step 148. Preferably, the same computer used to download the memory information is used. The computer is coupled to the connector that is eventually to be used as a network connection. The configuration may then simulate a network by passing test signals to the integrated door unit to obtain responses from the integrated door unit. The test signals are preferably configured like a data output word from another integrated door unit on a network. Once the functionality has been tested, the door may be fully assembled. That is, the second door face may be mounted over the electrical components. Other hardware such as knobs, kickplates and hinges may also be coupled to the door.

The other doors of the network are also configured in the same manner. A number of doors may be loaded with configuration information and tested simultaneously.

The doors are then transported to the installation location in step 150 for installation. The door jambs may be installed during construction of the walls. At the site, the hinges are aligned with the other half of the hinges on the door jamb. In step 152, the power source is coupled to the door. In step 154, the door is coupled to the network. In actuality, steps 152 and 154 may be performed simultaneously since it is preferred that a single connector be used for network access and a coupling to the power source.

As will be evident to those skilled in the art in construction of a building, the doors are preferably not installed until most of the building is complete to protect the finished surfaces of the doors from becoming damaged.

It should be understood by those skilled in the art that variations and modifications to the preferred embodiments described above may be made without departing from the true scope of the invention as defined by the following claims. For example, certain components may be installed into the door jamb such as the position magnets.

What is claimed is:

1. A door assembly comprising:

a first outer face;

a second outer face spaced a predetermined distance from said first outer face;

an integrated door unit having a controller and a data map memory storing a logical address of a second door assembly for generating an output word directed to the second door assembly, said output word being a function of said data map memory;

a void between said first and second outer face sized to receive at least a portion of said integrated door unit;

a sensor coupled to said integrated door unit, said sensor generating a sensor output signal, said word formed at least partially in response to said sensor output.

2. A door assembly as recited in claim 1, further comprising an access control device.

3. A door assembly as recited in claim 2, wherein said access control device is one selected from the group consisting of a card reader, or a biometeric device.

4. A door assembly as recited in claim 2, wherein said access control device is a key pad.

5. A door assembly as recited in claim 2, wherein said sensor comprises a door-in-frame sensor.

6. A door assembly as recited in claim 2, wherein said sensor comprises a door- locked sensor.

7. A door assembly as recited in claim 2, wherein said sensor comprises a door latch sensor.

8. A door assembly as recited in claim 1, further comprising a first opening, said first opening sized to receive said connector.

9. A door assembly as recited in claim 1, wherein said integrated door unit comprises a door controller.

10. A door assembly as recited in claim 9, wherein said integrated door unit comprises a transceiver.

11. A door assembly as recited in claim 9, wherein said integrated door unit comprises a memory.

12. A door assembly as recited in claim 11, wherein said memory comprises an address memory.

13. A door assembly as recited in claim 11, wherein said memory comprises an algorithm memory.

14. A door assembly as recited in claim 11, wherein said memory comprises a protocol memory.

15. A door assembly as recited in claim 1, wherein said integrated door unit comprises a clock/calendar.

16. A door assembly as recited in claim 1, further comprising a wiring harness between said first and second outer faces, said wiring harness having a connector coupled thereto, said wiring harness coupled to said integrated door unit.

17. A building control system comprising a plurality of doors comprising:

a plurality of communication lines;

a plurality of integrated door units each associated with a respective door coupled through said communication lines, each of said plurality of door units having an address associated therewith;

each of said integrated door units having a memory storing said addresses of said plurality of door units in a data map, said integrated door units forming output data words for communicating with another of said plurality of integrated door units using at least one of said addresses from said data map.

18. A building control system as recited in claim 17, wherein said memory comprises an algorithm memory.

19. A building control system as recited in claim 17, further comprising an access control device.

20. A building control system as recited in claim 19, wherein security access control device is one selected from the group consisting of a card reader, or a biometric device.

21. A building control system as recited in claim 19, wherein said access control device is a key pad.

22. A building control system as recited in claim 17, further comprising a sensor generating an output.

23. A building control system as recited in claim 22, wherein said sensor comprises a door-in-frame sensor.

24. A building control system as recited in claim 22, wherein said sensor comprises a door-locked sensor.

25. A building control system as recited in claim 22, wherein said sensor comprises a door latch sensor.

26. A building control system as recited in claim 17, further comprising a first opening, said first opening sized to receive said connector.

27. A building control system as recited in claim 17, wherein said integrated door unit comprises a door controller.

28. A building control system as recited in claim 17, wherein said door controller is coupled to a central controller.

29. A building control system as recited in claim 17, further comprising a clock/calendar.

30. A building control system as recited in claim 29, wherein said controller generating an output control word having a data portion; said data portion having a time stamp generated in response to said clock/calendar.

31. A building control system as recited in claim 17, wherein said integrated door unit comprises a transceiver.

32. A building control system as recited in claim 17, wherein said memory comprises a protocol memory.

33. A building control system associated with a plurality of openings of a building comprising:

a plurality of communication lines;

a plurality of integrated door units coupled together with said plurality of communication lines, each of said integrated door unit forming data output words, each of said integrated door units having an address associated therewith;

each of said integrated door units having, a transceiver; and a door controller coupled to said transceiver, said transceiver receiving and directing data output words having a corresponding address to said door controller, said controller generating a response to said data corresponding output word directed to another of said plurality of integrated door units.

34. A building control system as recited in claim 33, further comprising a wiring harness coupling said communication lines to said integrated door unit.

35. A building control system as recited in claim 33, wherein said response is generating an output word.

36. A building control system as recited in claim 33, wherein said response is activating an output associated with said door.

37. A building control system as recited in claim 33, wherein the sensor is a door-in-frame sensor.

38. A building control system as recited in claim 33, further comprising a clock coupled to said door controller, said integrated door unit generating a control word having a data field containing a time and date stamp in response to said clock.

39. A building control system as recited in claim 33, wherein said integrated door units are coupled to a central controller.

40. A building control system as recited in claim 33, further comprising a memory.

41. A building control system as recited in claim 40, wherein said memory storing an address, and a data map.

42. A method for assembling a door comprising the steps of:

mounting an integrated door unit into an interior of a first outer face of a door;

coupling a connector to said integrated door unit;

securing the second outer face to the first outer face substantially having the electronic module between the first face and second face;

coupling a configuration computer to said connector;

loading an opening address into the memory;

loading a data map into said memory with an address of another door;

loading a communications protocol into said memory.

43. A method for assembling a door as recited in claim 42 further comprising the step of testing the functionality of said module by passing test signals through the connector.

* * * * *